M. KEJR.
COMBINED THRESHING, HARVESTING, AND BUNDLING APPARATUS.
APPLICATION FILED APR. 15, 1911.
1,027,484.
Patented May 28, 1912.
4 SHEETS—SHEET 2.
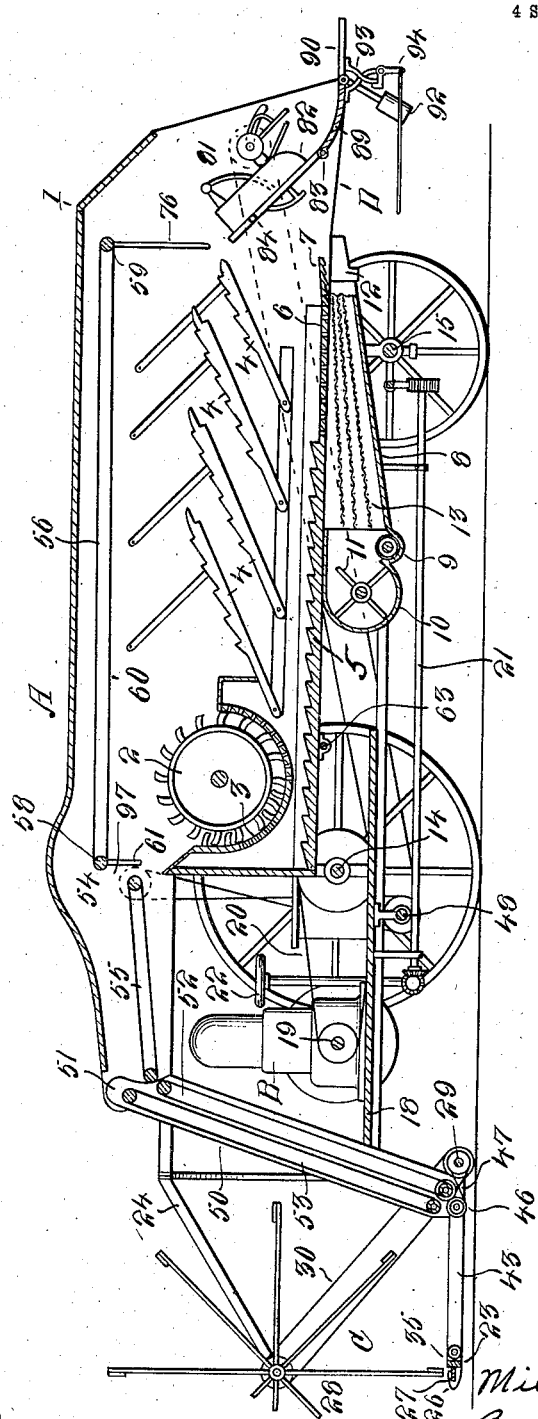
WITNESSES:
E. P. Ruppert
INVENTOR
Miles Kejr,
By
C. C. Hines,
Attorney M. KEJR.
COMBINED THRESHING, HARVESTING, AND BUNDLING APPARATUS.
APPLICATION FILED APR. 15, 1911.
1,027,484.
Patented May 28, 1912.
4 SHEETS—SHEET 3.
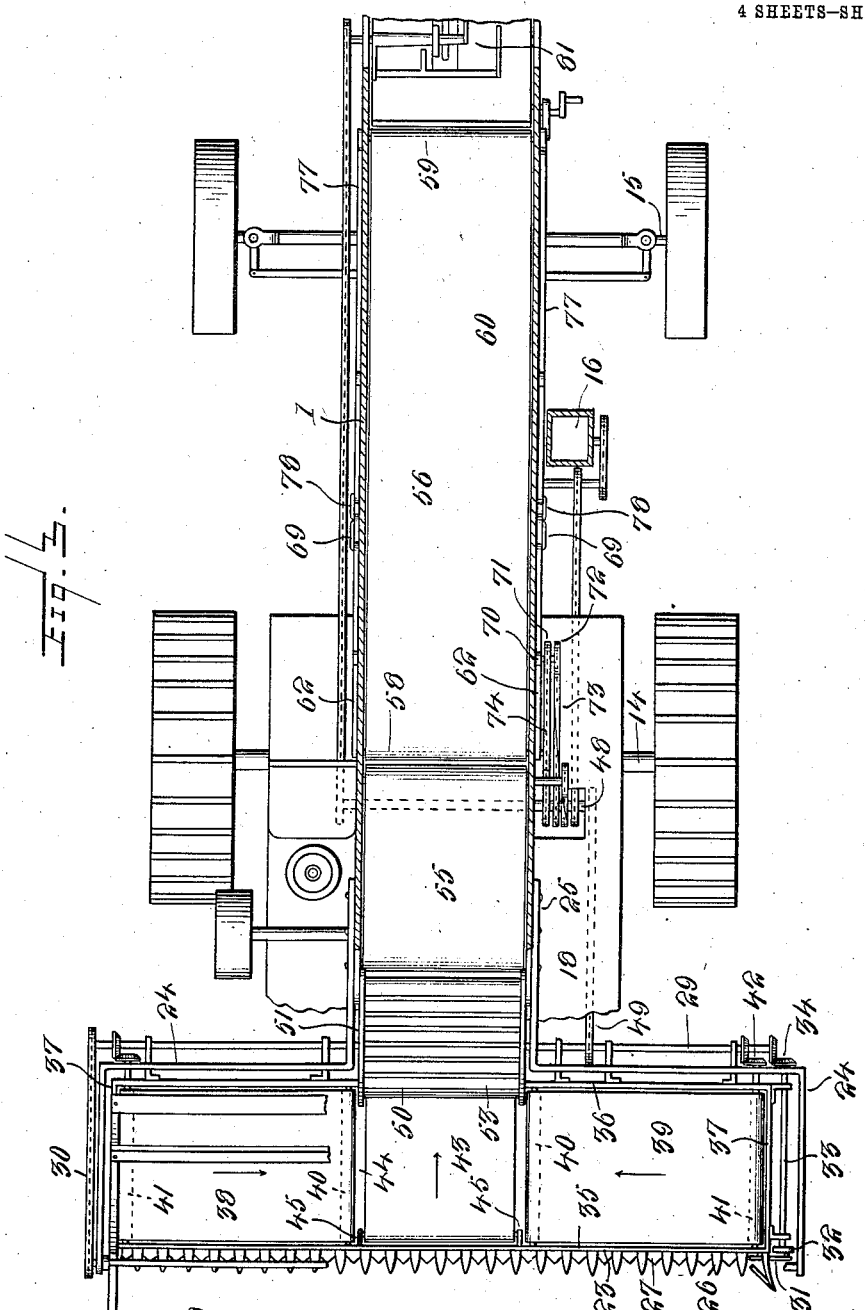
WITNESSES:
E. P. Ruppert.
Ruth Bredekamp
INVENTOR
Miles Kejr,
BY
C. C. Hines,
Attorney.

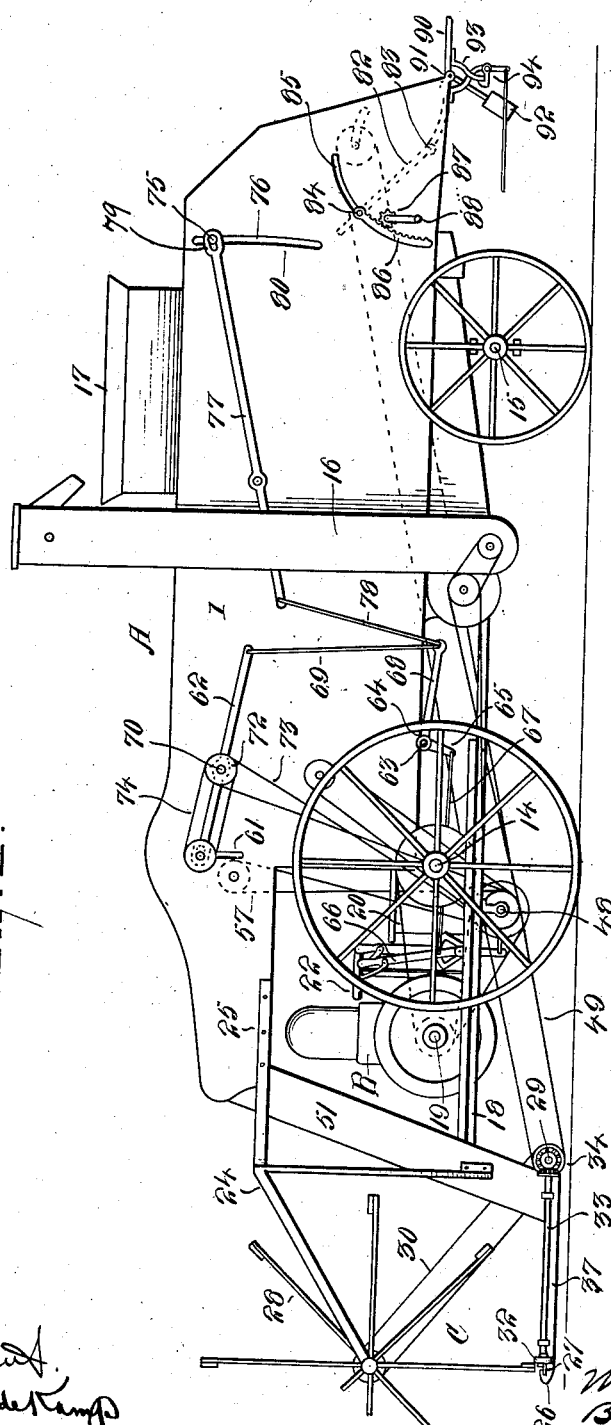

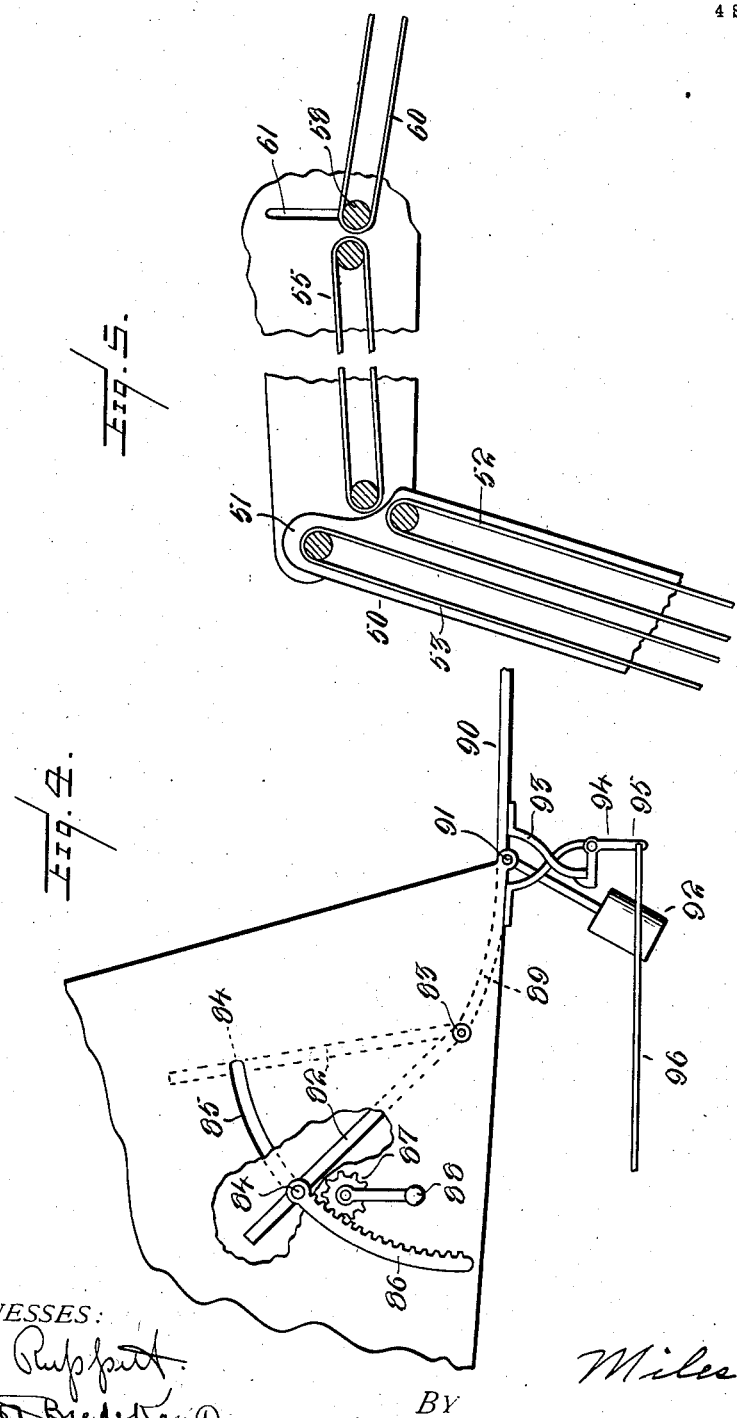

UNITED STATES PATENT OFFICE.

MILES KEJR, OF DORRANCE, KANSAS.

COMBINED THRESHING, HARVESTING, AND BUNDLING APPARATUS.

1,027,484.  Specification of Letters Patent.  Patented May 28, 1912.

Application filed April 15, 1911. Serial No. 621,314.

*To all whom it may concern:*

Be it known that I, MILES KEJR, a subject of the Emperor of Austria-Hungary, residing at Dorrance, in the county of Russell and State of Kansas, have invented certain new and useful Improvements in Combined Threshing, Harvesting, and Bundling Apparatus, of which the following is a specification.

This invention relates to combined threshing, harvesting and bundling apparatus, the object of the invention being to provide in apparatus of this character means whereby the material can be collected in the usual manner as is common in well known harvesting machines and then conveyed directly to the threshing mechanism to be threshed in the usual manner and then finally conveyed to the baling apparatus or if desired, the material may be conveyed directly to the baling mechanism upon which latter operation the material is bound in bundles and it may be stored until it is desired to thresh the same.

Other objects of the invention are to provide at the front of the material receiving platform of the apparatus cutting mechanism extending wholly across the forward end of the platform and receiving and conveying belts traveling in different directions and disposed immediately behind the cutting mechanism, the transverse extent of the combined belts being the same as the transverse extent of the said cutting mechanism so that very broad cutting and collecting surfaces are resultant; further the construction of one of the collecting and receiving belts whereby the cut material will be conveyed wholly and evenly to the concave of the threshing cylinder.

Another object of the apparatus is to provide, in connection with threshing mechanism, an adjustable support for the bundling mechanism whereby the bundling mechanism can be adjusted to lie directly in the path of the effective discharge of the material from the threshing mechanism when it is desired to form the material in bundles or further adjusted to lie out of the path of the discharging material so that the material can be deposited directly upon the ground.

In the drawings, forming a portion of this specification in which like numerals of reference indicate similar parts in the several views:—Figure 1 is a side elevation of my improved harvesting, threshing and bundling apparatus. Fig. 2 is a vertical section therethrough. Fig. 3 is a horizontal section through the apparatus with parts in full lines. Fig. 4 is an enlarged view of a portion of the apparatus showing in full lines the receiving position of the bundling mechanism and showing the discharge position thereof in dotted lines. Fig. 5 is a section through a portion of the apparatus showing the relatively adjustable conveyers moved to positions where one will deliver to the other.

In carrying out the present invention, I contemplate providing a threshing machine of any well known construction, and preferably one of the type shown at A in the drawings herein forming a portion of this invention. The machine includes a casing 1 provided therewithin adjacent to its front end with the usual cylinder 2 and its coöperating concave 3. Rearwardly of the cylinder and concave of the machine are the racks 4 which are disposed above the grain bottom 5 and the grate and bottom extension 6 and 7 respectively. The machine is provided beneath the grate 6 with the grain chute 8 which inclines downwardly from the rear of the machine toward the auger 9 and fan drum 10 and in open communication therewith so that the grain will be directed to the auger and the fan 11 when in operation will exert its energy to blow the chaff rearwardly to the usual tailings spout 12 and across the grates 13. The machine is mounted on the front and rear wheeled axles 14 and 15. The grain auger opens directly into the elevator 16, from which latter, the grain is deposited into the receiving receptacle 17.

The parts hereinabove enumerated and conventionally shown in the drawings are those which are essential and well known in a machine of this character and are only briefly referred to with a view of intelligently illustrating my invention.

The machine A is provided with a forwardly extending operator's platform 18 on which is supported the driving engine or motor B, preferably an internal combustion motor, the drive shaft 19 of which being connected in any suitable well known manner with the driven axle 14, preferably by the drive chain 20. The rear steering axle of the machine is operatively connected and geared to the steering shaft 21, which latter, in turn, is geared to the controlling wheel 22 on the platform 18 adjacent to the engine or motor.

The header mechanism C at the front of the platform 18 embodies a relatively low horizontally disposed frame 23 and a frame 24, the latter having suitable connections with the casing or housing 1, as at 25. The frame 23 carries at its front end the cutting apparatus which embodies a finger bar 26 and a reciprocating cutter 27. This cutting apparatus is disposed immediately beneath the axis of the horizontally disposed reel 28 which is mounted in the frame 24 and which is geared to the driving shaft 29 through the medium of the chain 30. The reciprocating cutter 27 is connected by the pitman 31 with the eccentric 32 on the shaft 33. The shaft 33 is journaled in suitable bearings on the frame 23 and geared to the shaft 29, as at 34.

The frame 23 is of rectangular form and includes the front and rear bars 35 and 36 and the end bars 37. Receiving and carrier belts 38 and 39 each provided with an inner idle roller 40 and an outer drive roller 41 have the shafts of the said rollers journaled in the front and rear bars 35 and 36 and the shafts of the outer rollers 41 are geared, as at 42, to the shaft 29. In this manner the belts 38 and 39 are driven in directions toward each other and in the direction of the receiving belt 43. This belt occupies the same general plane with the belts 38 and 39 and is disposed in the intervening space 44, the rollers of the belt 43 being journaled in bearings 45 in the frame 23. The roller 46 is belted to the shaft 29 as at 47, so that the belt will travel at right angles to the movement of the belts 38 and 39 and in a direction toward the rear of the threshing machine. The shaft 29 receives its power from the countershaft 48 of the engine or motor, a belt chain 49 preferably connecting the said shafts with each other.

An elevator 50 embodying a frame 51 and companion parallel carrier belts 52 and 53 extends upwardly and rearwardly from the inner end of the belt 43, the upper end of the said elevator being disposed in discharging proximity with respect to the directing and conveying mechanism 54.

The material feeding and conveying or directing mechanism comprises a front endless conveyer 55 and a rear cut-off and directing endless conveyer 56 the former being geared to the countershaft by the drive chain 57. The conveyer 56 includes the drums or rollers 58 and 59 and the belt 60, the shaft of the roller 58 being extended through vertical slots 61 in the side walls of the threshing machine casing 1 and journaled in the forward ends of the rock levers 62. These levers are pivoted intermediate of their ends to the walls of the casing.

A rock shaft 63 is mounted beneath the casing 1 and as illustrated, it has mounted thereon bell crank levers 64, the short arm 65 of one of the levers being connected to the controlling lever 66 as at 67, the lever 66 being mounted on the platform 18 in convenient reach of the operator. The long arms 68 of the levers 64 are connected by rods or the like 69 to the rear ends of the levers 62. The lever 62 at one side of the machine supports a stub shaft 70 on which the sprocket gear wheels 71 and 72 are secured, one of which being geared to the countershaft 48, as at 73, and the other geared to the front roller shaft of the conveyer 56, as at 74. The rear roller of the conveyer 56 has its shaft 75 extended through slots 76 in the sides of the casing and journaled in the rear ends of rock levers 77 on the casing, the forward ends of the levers being connected by the rods 78 to the long arms of the levers 64. The slots 61 and 76 are vertically disposed and constructed to permit of a limited vertical adjustment of the conveyer 56. The rear ends of the levers 77 have their bearing passages 79 somewhat elongated and the slots 76 are provided with substantially arcuate portions 80 so as to allow the rear end of the conveyer 56 to be adjusted if desired to lie slightly below the plane of the front end of the conveyer for a purpose to be hereinafter described.

The bundle forming or binding mechanism 81 can be of any well known construction and as shown, it is mounted on a platform 82 which is pivotally supported at 83 to the sides of the casing 1 at the rear open end thereof. A stem 84 at one side of the platform 82 extends through an arcuate slot 85 in one side of the casing 1 and as illustrated, it has secured thereto a rack segment 86 which is disposed concentric with respect to the pivot 83 and in mesh with a gear wheel 87 on the operating crank shaft 88, whereby any required adjustment of the bundling mechanism can be obtained. The discharge end of the bundling mechanism extends directly onto the upward end of a rearwardly curved apron 89 so that when the bundles are discharged, they will be thrown directly upon the receiver 90. The receiver is normally horizontally disposed and the forward end thereof is pivoted to the rear end of the apron, as at 91, a counterbalancing weight 92 being mounted on the receiver and operating to hold the same in the said normally horizontal bundle receiving position. To prevent the receiver from tilting to discharge position under the application of the weight of but few bundles thereto, I provide the receiver with a keeper 93 which is engaged with a pivoted latch 94. The latch is mounted in a suitable bracket on the casing 1, and as shown, it carries an arm 95 to which the controlling rod 96 from the platform 18 extends. In this manner of mounting the receiver, the bundles can be dumped therefrom in any desired quantities.

In describing the operation of the machine, it may be stated that when it is desired to thresh the material as it is fed to the machine, the conveyers 55 and 56 are adjusted relatively so as to form therebetween a gap 97, as shown in Fig. 2 of the drawings, whereby the material when discharged from the conveyer 55 will be delivered directly to the concave 3 to then be operated on as in the usual operation of a threshing machine. If the operator desires to form the threshed material into bundles, the mechanism 81 is adjusted to the position shown in Fig. 2 so that it will lie directly in the path of the material to effectively receive the same. As hereinbefore described, the mechanism can be of any well known construction which may be found best adapted for the purpose intended, which, when in operation, will rapidly form the bundles and discharge them upon the receiver 90. Should it not be desired to form the threshed material into bundles, the mechanism 81 can be adjusted to a position, as shown by dotted lines in Fig. 4, where the material will be allowed to find its escape from the opening D of the casing 1. The material when collected may, on adjustment of the conveyer 56 to close the gap 97, be fed directly upon the conveyer 56 and then to the bundling mechanism. This operation is desirable owing to the fact that grain can be rapidly collected from the field and afterward threshed at the convenience of the operator.

The machine can be used simply as a harvester and in such use, the conveyer 56 is adjusted to receiving proximity with respect to the conveyer 55 and to a position whereby the material may be discharged directly from the rear of the machine to be deposited directly upon the ground.

The engine or motor conventionally shown in the drawings may be provided with a suitable driving pulley by means of which power from the motor can be supplied to various farm apparatus, such as pumps or the like, to drive the same, and the machine may be converted into a simple tractor by removing the harvesting, threshing and bundling devices.

I claim:

1. In an apparatus of the character described, the combination of a frame or casing having an inlet throat or passage at its forward end and outlets arranged respectively at its rear end and in its bottom adjacent thereto, a threshing mechanism including a cylinder and concave communicating with said throat, a gathering mechanism including a feeder for conveying the gathered material to said throat, a bundling mechanism at the rear of the casing between said outlets, and a conveyer adjustable to open or close said throat and arranged when in throat-closing position to convey the material from said feeder toward the bundling mechanism, said bundling mechanism and conveyer being relatively adjustable for the feed of the material either to the bundling mechanism or to the bottom outlet when the conveyer is in throat-closing position.

2. In an apparatus of the character described, the combination of a frame or casing having an inlet throat or passage at its forward end and outlets arranged respectively at its rear end and in its bottom adjacent thereto, a threshing mechanism including a cylinder and concave communicating with said throat, a gathering mechanism including a feeder for conveying the gathered material to said throat, a bundling mechanism at the rear of the casing between outlets and adjustable toward the respective outlets out of and into receiving position, and a conveyer adjustable to open or close said throat and when in throat-closing position to convey the material from said feeder to the bundling mechanism when the latter is in receiving position or to the bottom outlet when said bundling mechanism is out of receiving position.

3. In an apparatus of the character described, the combination of a frame or casing having an inlet throat or passage at its forward end and outlets arranged respectively at its rear end and in its bottom adjacent thereto, a threshing mechanism including a cylinder and concave communicating with said throat, a gathering mechanism including a feeder for conveying the gathered material to said throat, a bundling mechanism at the rear of the casing between said outlets and below the level of the cylinder and concave and above the level of the bottom outlet and adjustable toward the respective outlets out of and into receiving position, means for adjusting the same, a conveyer vertically adjustable in guides to different degrees at its front and rear ends to open or close said throat and when in throat-closing position to convey the material from said feeder to the bundling mechanism when the latter is in receiving position or to the bottom outlet when said bundling mechanism is out of receiving position, and means for adjusting said conveyer.

In testimony whereof I affix my signature in presence of two witnesses.

MILES KEJR.

Witnesses:
J. F. TOBIAS,
C. R. JELLISON.